(12) United States Patent
Rodinger et al.

(10) Patent No.: US 9,801,246 B2
(45) Date of Patent: Oct. 24, 2017

(54) DIMMABLE LED LIGHT

(71) Applicants: Tomas Rodinger, Vancouver (CA); Gimmy Chu, Mississauga (CA); Christian Yan, Scarborough (CA)

(72) Inventors: Tomas Rodinger, Vancouver (CA); Gimmy Chu, Mississauga (CA); Christian Yan, Scarborough (CA)

(73) Assignee: NANOGRID LIMITED, Kowloon (HK)

( * ) Notice: Subject to any disclaimer, the term of this patent is extended or adjusted under 35 U.S.C. 154(b) by 0 days.

(21) Appl. No.: 15/306,359

(22) PCT Filed: Apr. 22, 2015

(86) PCT No.: PCT/CA2015/050336
§ 371 (c)(1),
(2) Date: Oct. 24, 2016

(87) PCT Pub. No.: WO2015/161379
PCT Pub. Date: Oct. 29, 2015

(65) Prior Publication Data
US 2017/0055325 A1 Feb. 23, 2017

Related U.S. Application Data

(60) Provisional application No. 61/983,460, filed on Apr. 24, 2014.

(51) Int. Cl.
*H05B 33/08* (2006.01)
*F21K 9/238* (2016.01)
(Continued)

(52) U.S. Cl.
CPC ..... *H05B 33/0845* (2013.01); *H05B 33/0803* (2013.01); *H05B 33/0815* (2013.01);
(Continued)

(58) Field of Classification Search
CPC .................. H05B 33/0815; H05B 33/0845
See application file for complete search history.

(56) References Cited

U.S. PATENT DOCUMENTS

2010/0148691 A1* 6/2010 Kuo .................. H05B 33/0815
315/291
2012/0242247 A1* 9/2012 Hartmann .......... H05B 33/0863
315/294
(Continued)

FOREIGN PATENT DOCUMENTS

CN 103124458 B 4/2016
EP 2611263 A2 7/2013

OTHER PUBLICATIONS

WIPO, International Search Report and Written Opinion for PCT Application No. PCT/CA2015-050336 dated Jul. 31, 2015.

*Primary Examiner* — Douglas W Owens
*Assistant Examiner* — Pedro C Fernandez
(74) *Attorney, Agent, or Firm* — Norton Rose Fulbright Canada LLP; Maya Medeiros

(57) ABSTRACT

The light intensity level of a dimmable LED bulb is set by interruption of the AC signal by the user. The bulb's driver circuit includes a controller having dimmer control logic for controlling the brightness. Optionally, the LED bulb can be dimmed by an external TRIAC dimmer.

9 Claims, 12 Drawing Sheets

(51) Int. Cl.
*F21K 9/232* (2016.01)
*F21Y 115/10* (2016.01)
*F21K 9/235* (2016.01)
*F21V 19/00* (2006.01)

(52) U.S. Cl.
CPC .......... H05B 33/0851 (2013.01); *F21K 9/232* (2016.08); *F21K 9/235* (2016.08); *F21K 9/238* (2016.08); *F21V 19/003* (2013.01); *F21V 19/006* (2013.01); *F21Y 2115/10* (2016.08); *Y02B 20/383* (2013.01)

(56) References Cited

U.S. PATENT DOCUMENTS

| | | | |
|---|---|---|---|
| 2013/0038227 A1* | 2/2013 | Yan | H05B 33/0818 315/186 |
| 2015/0022109 A1* | 1/2015 | Lee | H05B 33/0845 315/200 R |

* cited by examiner

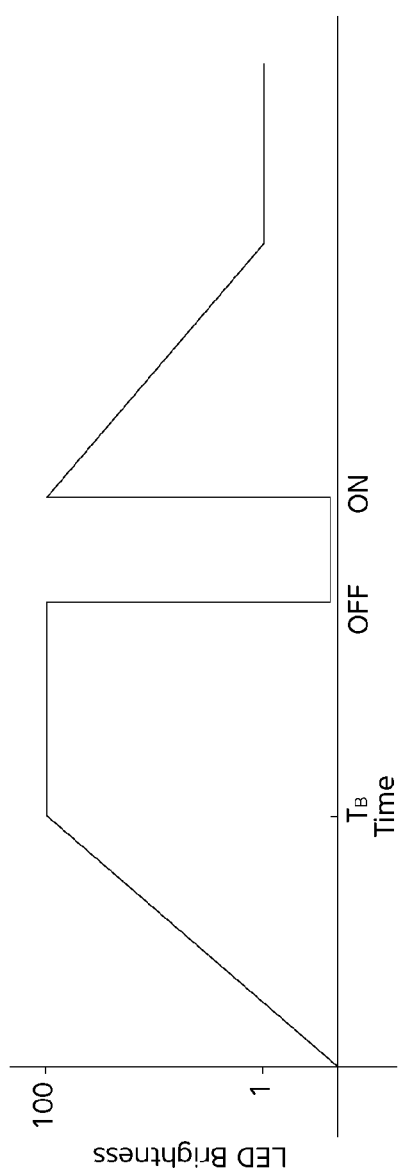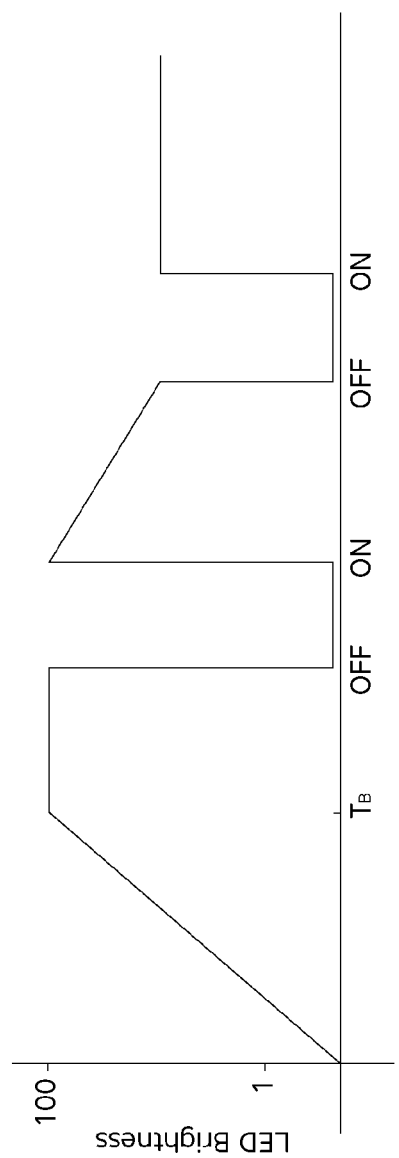

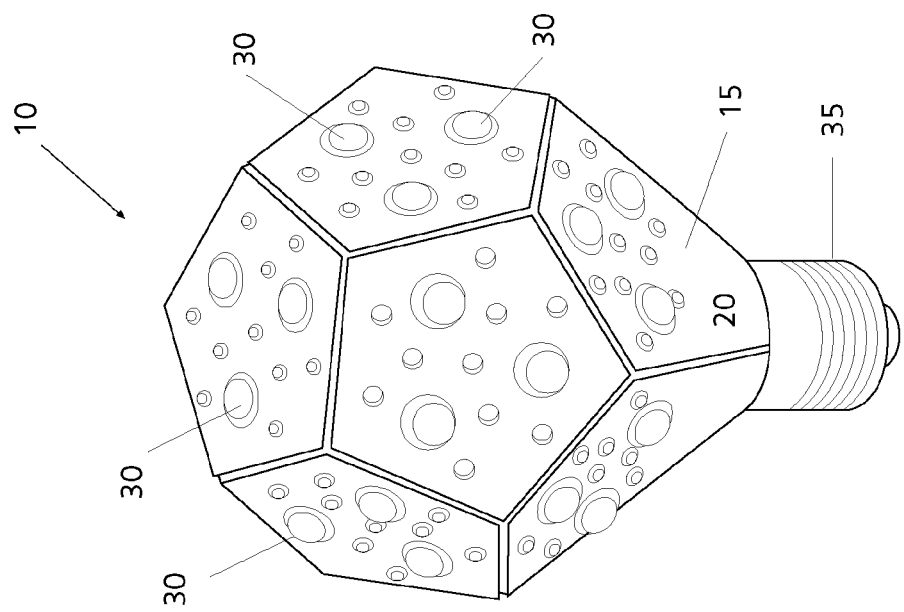

DIMMABLE LED LIGHT

TECHNICAL FIELD

The present invention generally relates to a dimmable light emitting diode (LED) illumination device, which does not require a separate, external dimmer switch. More particularly, the present invention relates to a dimmable LED light bulb having a circuit which controls the light intensity based on manipulation of an on/off switch. Optionally, the light intensity can also be controlled with a separate dimmer switch. The circuit may be implemented into any LED bulb, including an LED bulb which is fabricated by folding a two-dimensional printed circuit board with LEDs mounted thereon into a three-dimensional structure. The three dimensional structure is configured to fit into a standard light fitting.

BACKGROUND OF THE INVENTION

Dimmable incandescent bulbs, which operate on AC circuits, are well known. Typically they require a separate dimmer switch, also known as a legacy dimmer, which is wired to the electrical connection. Legacy dimmers employ a triode AC switch, also known as a TRIAC.

Some dimmable incandescent bulbs do not require a separate dimmer switch. For example, U.S. Pat. No. 5,214,354 discloses an incandescent bulb comprising an electronic control module which is coupled to the screw fitting and the circuit. The module comprises a TRIAC.

Dimmable LED bulbs, which operate on DC circuits, are also well known. Most also require a separate dimmer switch which is wired to the electrical connection. Certain dimmable LED bulbs are compatible with legacy dimmers while others require a dimmer switch for use specifically with an LED bulb. Still other dimmer switches, known as universal dimmers, can control the dimness settings for both incandescent and LED lights as well as CFL and halogen lights. These dimmer switches have a more complicated electronic configuration and typically comprise a semiconductor switch, such as a MOSFET, and integrated circuit (IC).

More recently, some dimmable LED bulbs do not require a traditional dimmer switch to control the light's brightness. For example the dimmable LED bulbs known as Philips Hue (TM) and LIFX (TM) are designed for the brightness to be controlled using a WiFi controlled application, such as a mobile phone application or other computer control mechanism, which provides dimmer control of the bulb. This requires the use of a smart phone or access to a computer and communication network for the user to transmit communications, including the desired light intensity level, to the dimmable light bulb in order to dim the bulb.

Some LED bulbs incorporate a chip such as the NCL30083 IC made by Semiconductor Components Industries, LLC (Phoenix, Ariz.). This a PWM current mode controller which provides 5 step dimming functionality for an LED circuit, controllable by toggling an on/off switch. The set light intensity levels are 70%, 40%, 25%, 10% and 5% of output current. The 5% output current corresponds to 17% of perceived brightness. The chip, which is not a microcontroller, does not allow for continuous dimming up and down or a simple way for the user to quickly and intuitively set the desired light intensity level.

Dimmers and complicated methods for dimming LED bulbs do not address the need in the market to replace standard incandescent bulbs with dimmable LED bulbs, which can be dimmed to desired levels in any light fixture, with or without a dimmer switch or other complicated communication protocols.

There is a need for a simple way to control a continuous dimming function in a LED light to a desired light intensity which does not rely on a dimmer switch. There is also a need for a dimmable LED light which can dim to a plurality of desired light intensity levels with or without a separate, external dimmer switch.

SUMMARY OF THE INVENTION

According to one embodiment of the invention, there is provided a dimmable LED light device including a power input terminal for receiving power from an AC power source, a signal converter for converting the AC power received at the input terminal into DC power, an LED array powered by the DC power and a controller between the signal converter and the LED array configured to control the brightness of the LED array in response to temporary interruptions in AC power.

In one aspect of the invention, there is further provided a low voltage supply receiving DC power from the signal converter and for generating an input voltage to the controller and to the LED array.

In another aspect of the invention, there is further provided a capacitor connected to the controller; the capacitor configured to provide an operating current to the controller until its charge is depleted.

In another aspect of the invention, the capacitor is selected such that its charge is depleted at a predetermined time; wherein the predetermined time is less than a time of the temporary interruption in AC power such that the controller remains operational during the temporary interruptions in AC power.

In another aspect of the invention, there is further provided a switch controlling power to the LED array and configured to open and close based on signals received from the controller.

In another aspect of the invention, the controller includes logic to control the brightness of the LED array; the logic including indicators of a change state defining whether or not the LED array is dimming and a direction indicator defining whether the LED array is dimming up over time or dimming down over time.

In another aspect of the invention, the controller further includes memory which stores light intensity levels, light intensity change states and light intensity directions.

In another aspect of the invention, the controller controls the brightness of the LED array by detecting the time between the temporary interruptions in AC power.

In another aspect of the invention, the temporary interruptions in AC power are provided by the detection of a user cycling an ON/OFF power switch.

According to another embodiment of the invention, there is provided a method for controlling the brightness of an LED light array including providing AC power to a power input terminal, converting the AC power received at the input terminal into DC power, powering the LED array powered by the DC power, and controlling the brightness of the LED array in response to temporary interruptions in AC power by way of a controller.

In one aspect of this embodiment, the method includes generating an input voltage to the controller by a low voltage supply receiving DC power.

In another aspect of this embodiment, the method includes providing a capacitor connected to the controller;

the capacitor configured to provide an operating current to the controller until its charge is depleted.

In another aspect of this embodiment, the capacitor is selected such that its charge is depleted at a predetermined time; wherein the predetermined time is less than a time of the temporary interruption in AC power such that the controller remains operational during the temporary interruptions in AC power.

In another aspect of this embodiment, the method includes switching power to the LED array and configured based on signals received from the controller.

In another aspect of this embodiment, the controller includes logic to control the brightness of the LED array; the logic including indicators of a change state defining whether or not the LED array is dimming and a direction indicator defining whether the LED array is dimming up over time or dimming down over time.

In another aspect of this embodiment, the controller further includes memory which stores light intensity levels, light intensity change states and light intensity directions.

In another aspect of this embodiment, the brightness of the LED array is controlled by detecting the time between the temporary interruptions in AC power.

In another aspect of this embodiment, the method includes detecting a user cycling an ON/OFF power switch to identify the temporary interruptions in AC power.

BRIEF DESCRIPTION OF THE DRAWINGS

The features of the present invention, together with the advantages thereof may be best understood by reference to the following description taken in conjunction with the accompanying drawings, wherein like reference signs identify like elements, and wherein:

FIG. 12 is a plot of low dim mode from full brightness over time in accordance with one embodiment of the present invention;

FIG. 13 is a plot of dim mode from full brightness over time in accordance with one embodiment of the present invention;

FIG. 16 is a schematic perspective view of an LED light which implements the circuitry of one embodiment of the present invention.

DETAILED DESCRIPTION OF THE INVENTION

Figure 1:
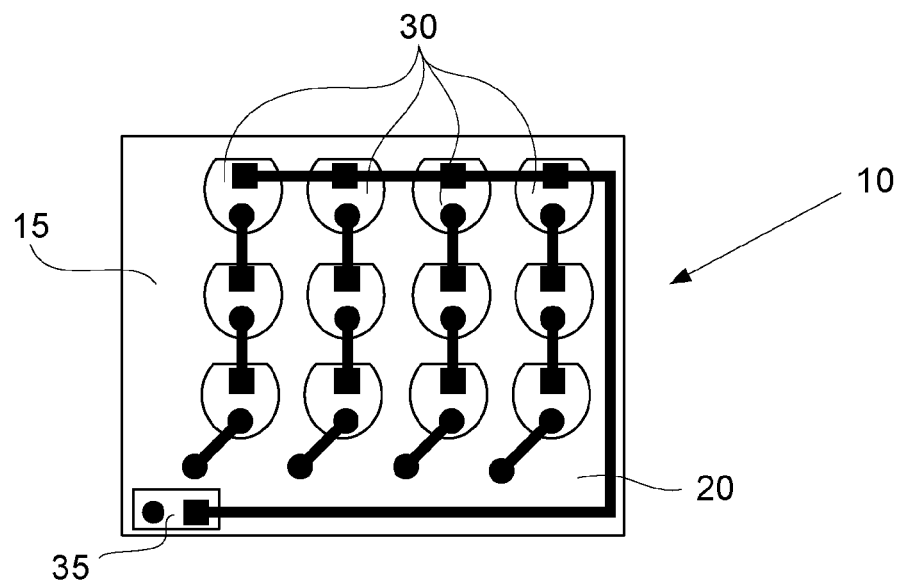
FIG. 1 is a top plan schematic view of an LED light according to one embodiment of the present invention.

This invention is not limited in its application to the details of construction and the arrangement of components set forth in the following description or illustrated in the drawings. The invention is capable of other embodiments and of being practiced or of being carried out in various ways. In addition, the terminology used herein is for the purpose of description and should not be regarded as limiting.

The following definitions are used herein:

LC filter means a series resonant circuit comprising an inductor and a capacitor configured to act as a filter.

LED means a light emitting diode.

LED array means a plurality of LEDs connected in any arrangement.

LED light means an illumination device comprising at least one LED, which can take the form of a light bulb or other device which emits light and which includes lights having the general characteristics described in U.S. patent application Ser. No. 14/152,928 filed Jan. 10, 2014 incorporated herein by reference in its entirety.

LED power converter means the section of the circuit which communicates with the IC and powers the LED array. The LED power converter may be a flyback, buck, boost, buck-boost, forward, or other known power converter. It includes several electronic components and must include a switch. It must also include either a transformer or inductor.

Low voltage supply means one or more electronic components which step down the input voltage for the IC and which may include a DC-DC power converter.

Switch means a transistor for switching electronic signals, such as a bipolar junction transistor (BJT), metal oxide semiconductor field effect transistor (MOSFET), or an insulated-gate bipolar transistor (IGBT).

Switch off-time means the period of time that the switch is opened (ie: not conducting) during a cycle.

Switch on-time means the period of time that the switch is closed (ie: conducting) during a cycle.

TRIAC means a TRIode for Alternating Current (AC) that is an electronic component/unit approximately equivalent to two silicon-controlled rectifiers joined in inverse parallel with their gates connected together.

The dimmable circuit of the invention is explained in detail with reference to the accompanying drawings. The description and explanatory embodiments herein are merely used to set forth the present invention, and not to limit the invention.

According to one embodiment of the present invention, a dimmable circuit is provided in an LED light such that the light is capable of dimming without an external dimmer.

According to another embodiment of the present invention, a dimmable circuit is provided in an LED light such that the light is capable of dimming with an external dimmer.

While the implementation of the circuit of the present invention is described for use in a specific LED light, the circuit is designed to be used with any LED light, regardless of the light's structure. The circuit therefore may be implemented into the design of circuits for other LED bulbs so that such bulbs may be used in light fixtures without requiring an external dimmer.

Figure 2:
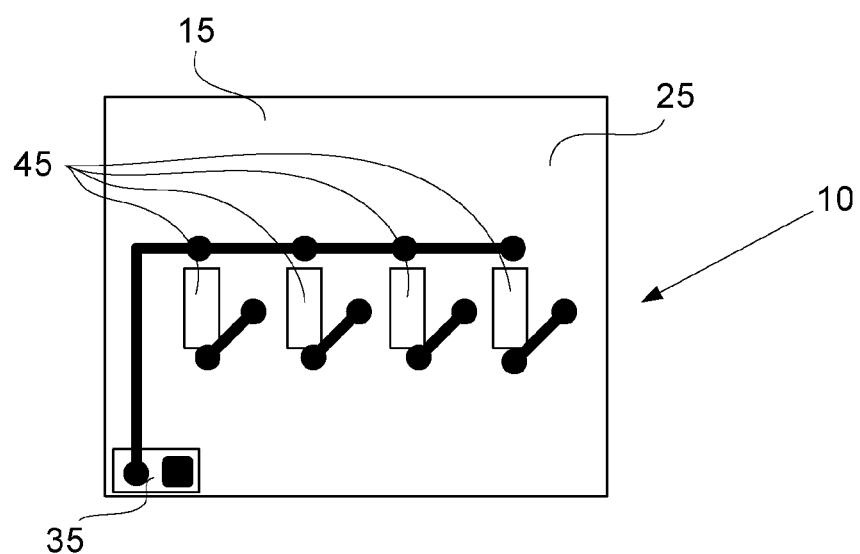
FIG. 2 is a bottom plan schematic view of the LED light of FIG. 1.
Figure 3:
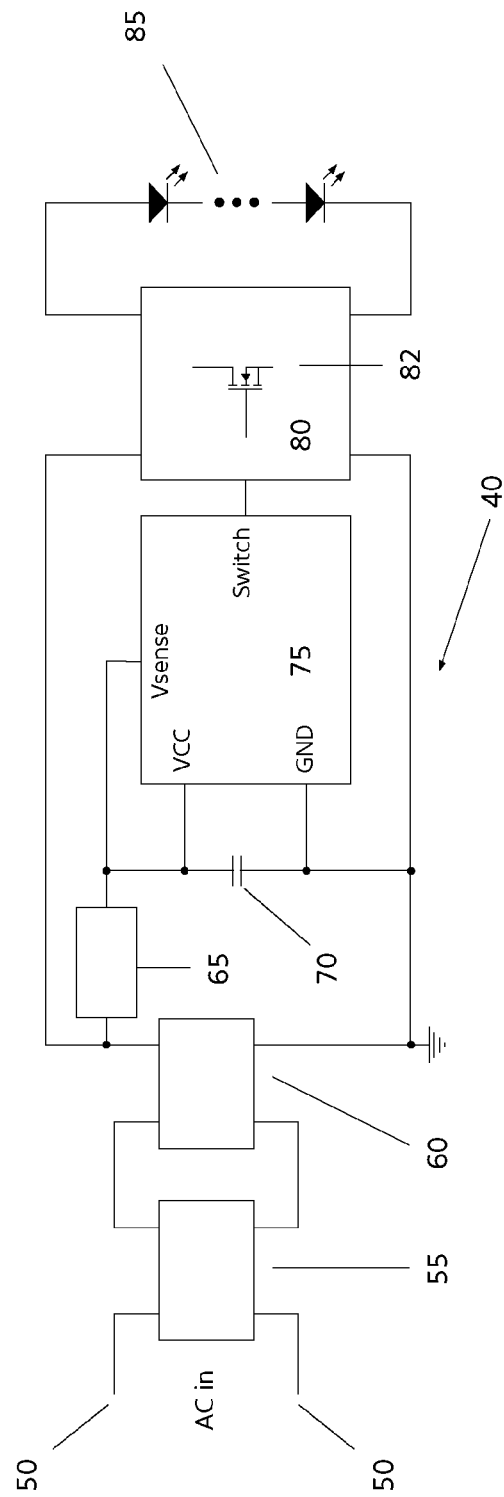
FIG. 3 is a block diagram of the LED light according to one embodiment of the present invention.

FIGS. 1 and 2 illustrate schematics of an LED light according to one embodiment of the present invention. The LED light 10 comprises a printed circuit board (PCB) 15 having a first outer side 20 and a second inner side 25. One or more LEDs 30 are coupled to PCB 15 and extend from the first outer side 20. In one embodiment (not illustrated), just one LED is coupled to PCB 15. In the illustrated embodiment, a plurality of LEDs 30 are coupled to PCB 15 in an LED array 85 as illustrated in FIG. 3. The LED array may be in any arrangement according to the LED light configuration's power and design requirements. A connector 35 extends from PCB 15 for coupling to an AC power source (not shown). Connector 35 may be any type of fitting including a standard Edison fitting, bayonet mount or wedge base. Connector 35 is connected to electronic circuit 40 (FIG. 3) to provide power to the LEDs 30 for illumination.

On second inner side 25 of PCB 15, there are disposed a plurality of electronic components 45 which are connected to circuit 40 and which are selected and arranged in accordance with the present invention and the LED light's design and performance parameters.

FIG. 3 illustrates a block diagram of the present invention showing circuit 40 and electronic components 45 (not labelled in this figure) including controller 75 which comprises dimmer control logic for continuous dimming. Circuit 40 is connectable to an AC power source by input terminals 50 on connector 35. Input terminals 50 are configured to receive an AC signal and output a rectified DC signal. An EMI filter and a rectifier 55 includes a plurality of components known in the art. Optionally, a gate may be connected to controller 75 so that controller 75 can detect the input voltage, such as 120 V or 220 V, so that circuit 40 can be configured for use globally. The rectified signal may then input into an optional LC filter 60.

In one embodiment (not illustrated), circuit 40 does not have an LC filter 60 and LED light 10 can only operate in a first dimming mode, namely where dimming is controllable by interruption to the AC signal.

Figure 15:
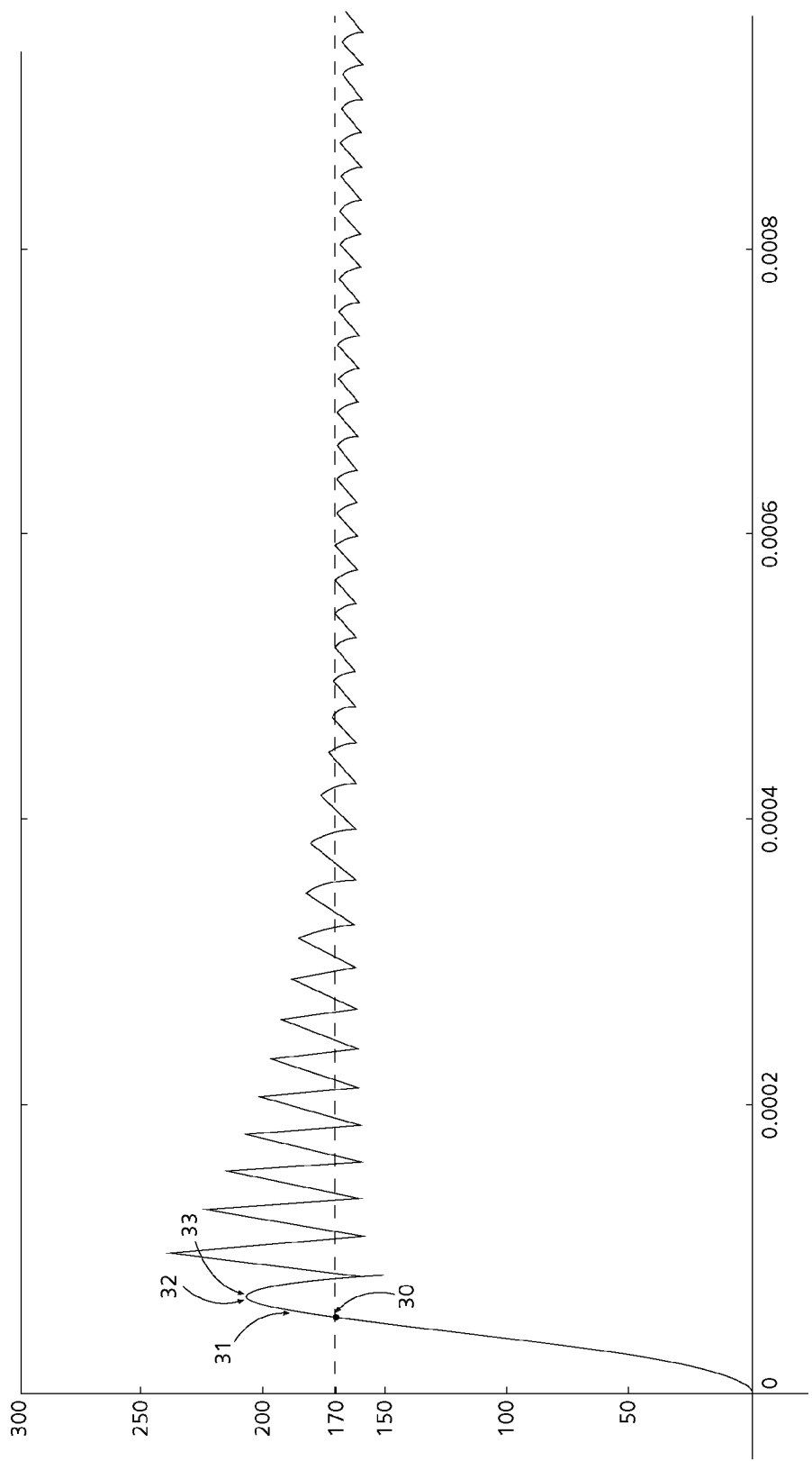
FIG. 15 is a simulated plot of an LC filter showing inductor current and capacitor voltage over time as the switch is toggled by an external dimmer in accordance with another embodiment of the present invention.

In a second embodiment (illustrated in FIG. 3), circuit 40 includes LC filter 60 such that LED light 10 can operate in both first and second dimming modes. In a tested embodiment shown at FIG. 4, the LC filter 60 comprises inductor L2 (10 mH) and capacitor C6 (0.1 µF, 277 VAC). The operation of inductor L2's current and capacitor C6's voltage of this embodiment is illustrated in FIG. 15. A second dimming mode is controllable by a separate, external legacy TRIAC dimmer. In the second embodiment, the inductor of the LC filter 60 is selected to be large, such as 10 mH or more. The input voltage and current in the inductor of the LC filer 60 is monitored by controller 75. As current in the inductor varies, controller 75 determines whether it is being manipulated external to circuit 40, namely by the TRIAC dimmer (not shown). In this case, the logic of the first embodiment is bypassed and the LED light 10 works like a prior art LED light which is configured to function with a TRIAC dimmer. LED light 10 of the second embodiment may be used with or without a TRIAC dimmer.

In the first embodiment of the present invention, the rectified DC signal is received by a low voltage supply 65 for generating a filtered input voltage to the controller 75 and the LED array 85. Low voltage supply 65 comprises a plurality of electronic components 45 to step down the voltage for the controller 75, such as from 120V to 3V. Low voltage supply 65 may optionally include a DC-DC power converter.

Capacitor 70 is connected to controller 75 and is configured to provide operating current to the controller IC over a fixed period, namely until its charge is depleted a short time after the AC input signal is toggled or interrupted. The AC input signal is interrupted such as by manually toggling the on/off switch to which LED light 10 is connected. The interruption may occur in other ways.

Capacitor 70 is chosen such that the fixed period of discharge is longer than the required time for the period of interrupting the AC signal, which is the delay between turning off and then turning on the light switch. The act of turning the light switch off and on is therefore a signal trigger for circuit 40 since it triggers discharge of capacitor 70 during the fixed period. The time when the AC signal is temporarily off can be referred to as a brown out.

Figure 8:
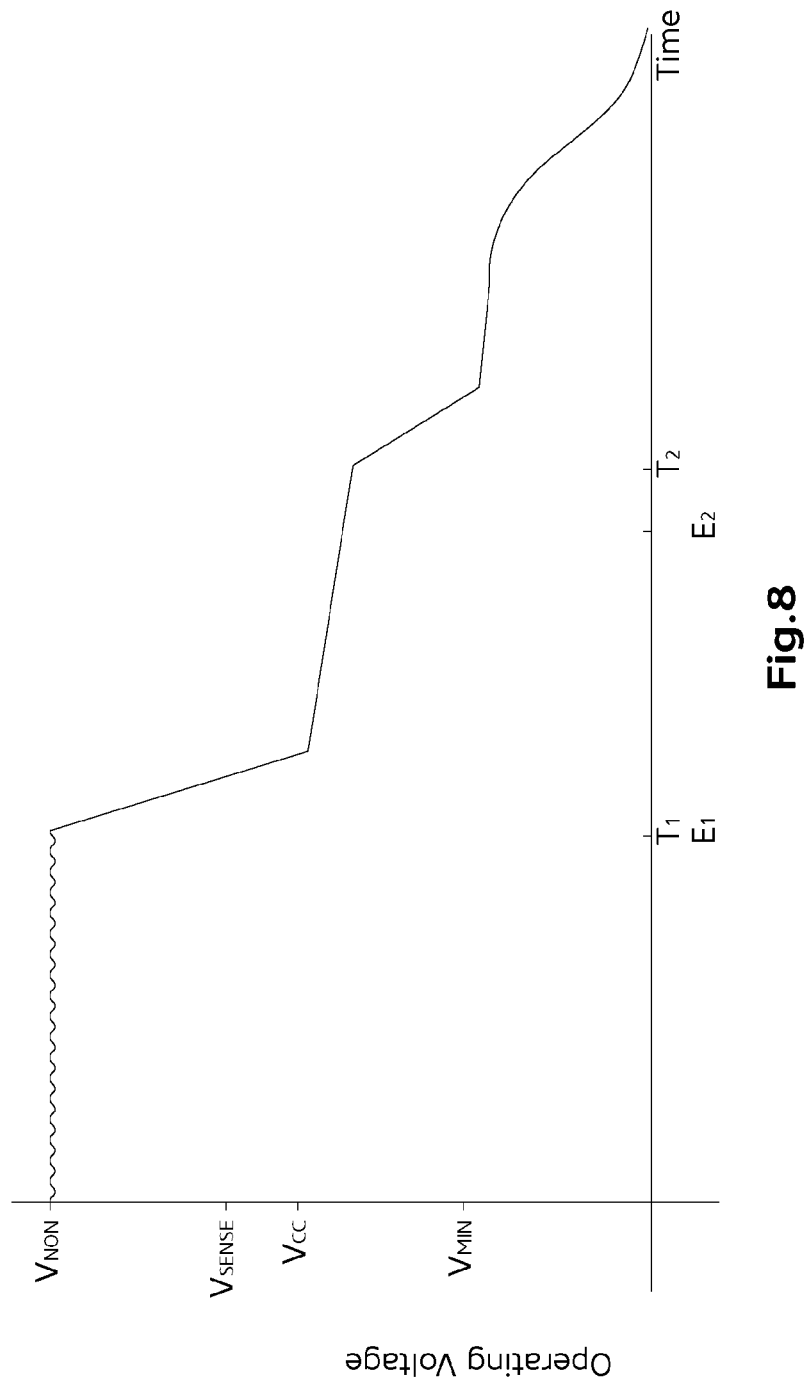
FIG. 8 is plot of a voltage drop during an OFF/ON interval in accordance with one embodiment of the present invention.

During a brown out, when capacitor 70 is discharging, controller 75 remains energized for a short time, namely until capacitor 70 does not meet the minimum voltage requirements of controller 75 ($V_{MIN}$ in FIG. 8). The amount of charge required to maintain controller 75 energized depends on the specific requirements of the controller and the amount of energy required to remain energized during a brown out. In order to optimize the time that controller 75 is energized during a brown out, controller 75 can be forced to minimize work such as by executing only required functions. For example, during a brown out, controller 75 may execute commands to put itself in a dormant or sleep mode so as to consume less energy than during normal operation.

Controller 75 senses when there is a drop in input voltage at input $V_{sense}$ by comparing the filtered input voltage to a reference voltage. If the filtered voltage is less than the reference voltage, controller 75 can change to a sleep mode. If the interruption time is longer than the fixed period of discharge by capacitor 70, controller 75 no longer has sufficient energy to maintain any function, even in sleep mode, and it simply loses charge, including any data which is stored in its temporary memory.

Controller 75 is coupled to LED power converter 80. LED power converter 80 includes a switch 82 such as a MOSFET or transistor. LED power converter 80 also includes a transformer or inductor, referred to as Transformer T hereafter for the purpose of illustration. In one embodiment illustrated in FIG. 4, LED power converter 80 includes a MOSFET (Q3) and a transformer (T1) having primary, secondary and auxiliary windings. The switch 82 is configured to close and open based on signals received from controller 75. LED power converter 80 may also include an output diode.

Figure 4:
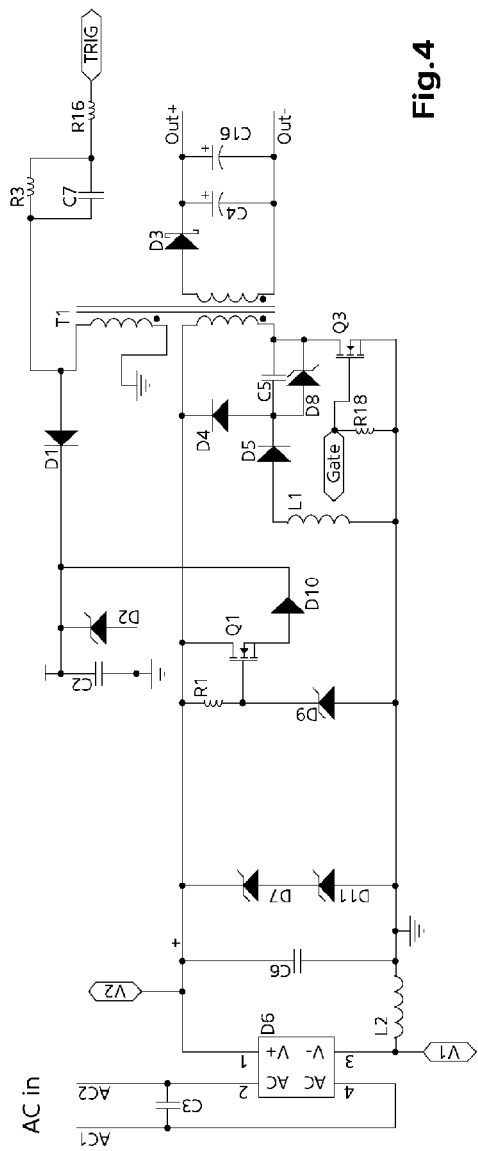
FIG. 4 is a schematic circuit diagram of the power section according to a first embodiment of the present invention.

In one embodiment at V=0, switch 82 is off. At V=10V, switch 82 is fully on. The switch is rated for 600 V and is configured to switch 50,000/s. When switch 82 is closed, energy is stored and builds in Transformer T which acts as an inductor. When switch 82 is open, the stored energy is transferred to LED array 85 through output diode (not shown in FIG. 3). To ensure there is minimal perceptible flicker across LED array 85, bulk storage capacitors (not shown in FIG. 3) may be disposed between Transformer T and LED array 85. FIG. 4 illustrates one embodiment of this configuration comprising output diode D3 and bulk storage capacitors C4 and C16.

When Transformer T is used in a circuit, losses occur by leakage inductance. In order to optimize circuit 40, a portion of the lost energy can be recovered and fed back into the circuit. FIG. 4 illustrates on embodiment of this configuration comprising electronic components D4, D5, D8, L1 and C5. This configuration is a type of snubber which prevents switch 82 (Q3 in FIG. 4) from breaking down due to voltage spikes resulting from the energy stored in the leakage inductance and also recovers some of this energy to minimize energy loss and optimize the efficiency of circuit 40. In one embodiment L1 is 500 mH and C5 is an NP0 capacitor.

Controller 75 comprises logic to control the brightness of LEDs 30 in response to temporary interruptions (brown outs) in the AC signal. In one embodiment, there are four possibilities of light intensity change states and light intensity direction. Light intensity change state means whether the LED light 10 is dimming (T), whether dimming to a higher intensity level or to a lower intensity level over time. If LED light 10 is not dimming (F), the light intensity is constant. Light intensity direction means dimming up (T) or dimming down (F).

The light intensity is configured from 1 to 100 where 1 is chosen as the lowest perceived amount of dim light. This standard may be altered. In one embodiment, light intensity level 1 is the minimal amount of light required to see at night, and may be referred to as Night Mode or Low Dim Mode. Optionally, the light intensity configured from 1 to 100 is configured to monotonously increase in a non-linear manner within this range. The human eye is more receptive to changes of brightness when light is dimmer. This is known as the Stevens' Power Law. Therefore, in this option the brightness levels correspond to a luminous flux from the LED array that is increasing non-linearly as the brightness level increases. The non-linear increase could be defined by, for example, parabolic functions, polynomial functions and exponential functions.

Figure 11:
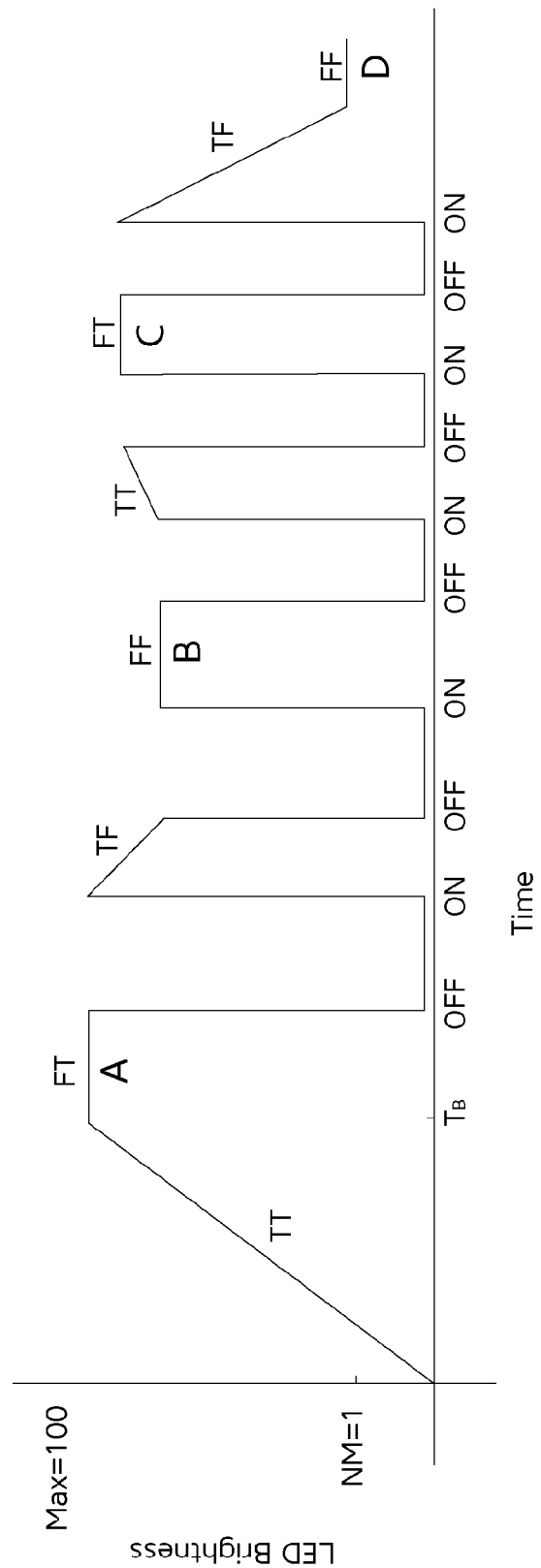
FIG. 11 is a plot of several brightness modes or intensity levels over time in accordance with one embodiment of the present invention.

Light intensity level 100 is the highest possible light intensity level or full brightness of the LED light 10. If light intensity change state is T and light intensity direction is T, the light intensity level can reach a maximum of 100, as illustrated in FIGS. 11 (first ascending slope TT) and 12. The light intensity level locks at 100 and the light intensity change state switches to F.

Conversely if light intensity change state is T and light intensity direction if F, the light intensity level reaches a minimum of 1, which is the lowest possible light intensity level, at which time the light intensity level locks at 1 and the light intensity change state switches to F. This is depicted in the second descending slope TF of FIG. 11 and in FIG. 12.

Table 1 illustrates the four possibilities described in this embodiment.

TABLE 1

Dimming States

| Change State | Direction | Function |
|---|---|---|
| T | T | Light level dimming up over time |
| T | F | Light level dimming down over time |
| F | T | Light level locked at a particular brightness |
| F | F | Light level locked at a particular brightness |

Table 2 illustrates the outcomes of one embodiment from a first state to a second state.

TABLE 2

Change from First to Second States

| First State | | Second State | |
|---|---|---|---|
| Change State | Direction | Change State | Direction |
| T | T | F | T |
| T | F | F | F |
| F | T | T | F |
| F | F | T | T |

Controller 75 executes the logic based on several inputs including the monitored filtered input voltage. Controller 75 includes memory which stores the light intensity levels, the light intensity change states and light intensity directions.

A given light intensity level corresponds to an on-time of switch 82. As such, by varying the on-time, the light intensity level varies. Controller 75 signals the on-time to switch 82 based on the logic and sensing of interrupted filtered voltage.

Figure 5:
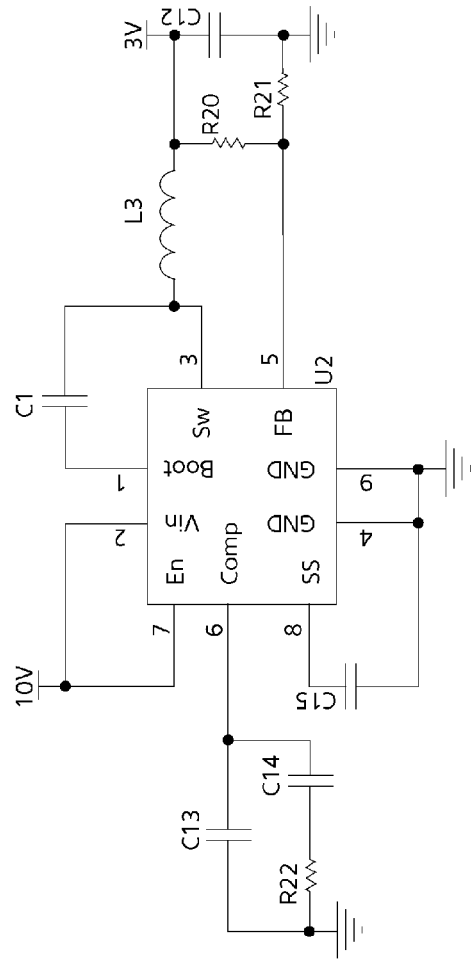
FIG. 5 is a schematic circuit diagram of the DC-DC power converter from the low voltage supply according to a first embodiment of the present invention.
Figure 6:
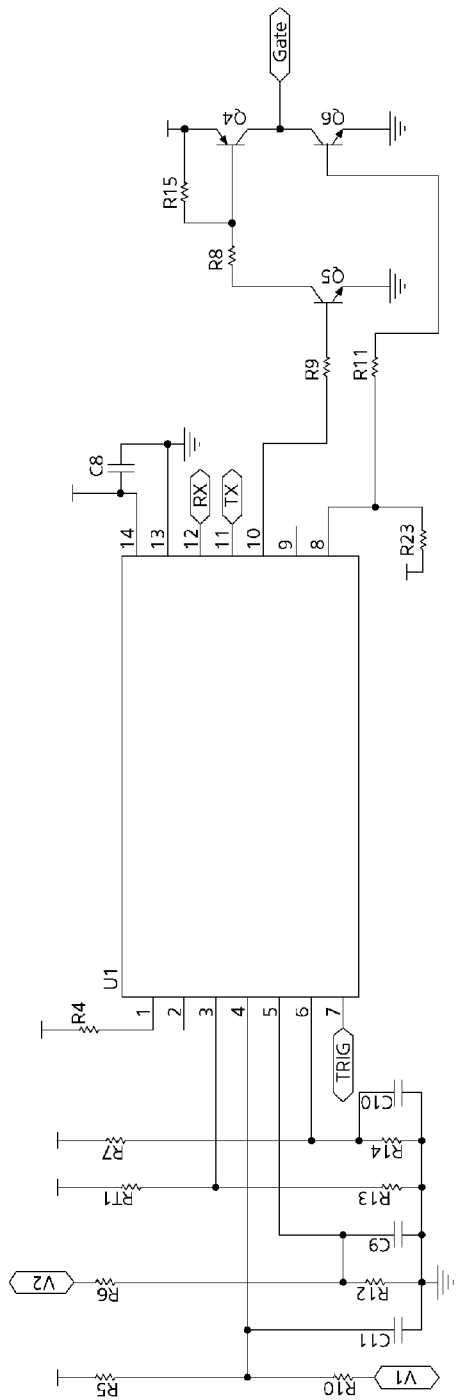
FIG. 6 is a schematic circuit diagram of the control section according to a first embodiment of the present invention.

Tested embodiments of the present invention are illustrated in FIGS. 4-6. An example of an LED light into which circuit 40 was implemented and tested is illustrated at FIG. 16.

Figure 9:
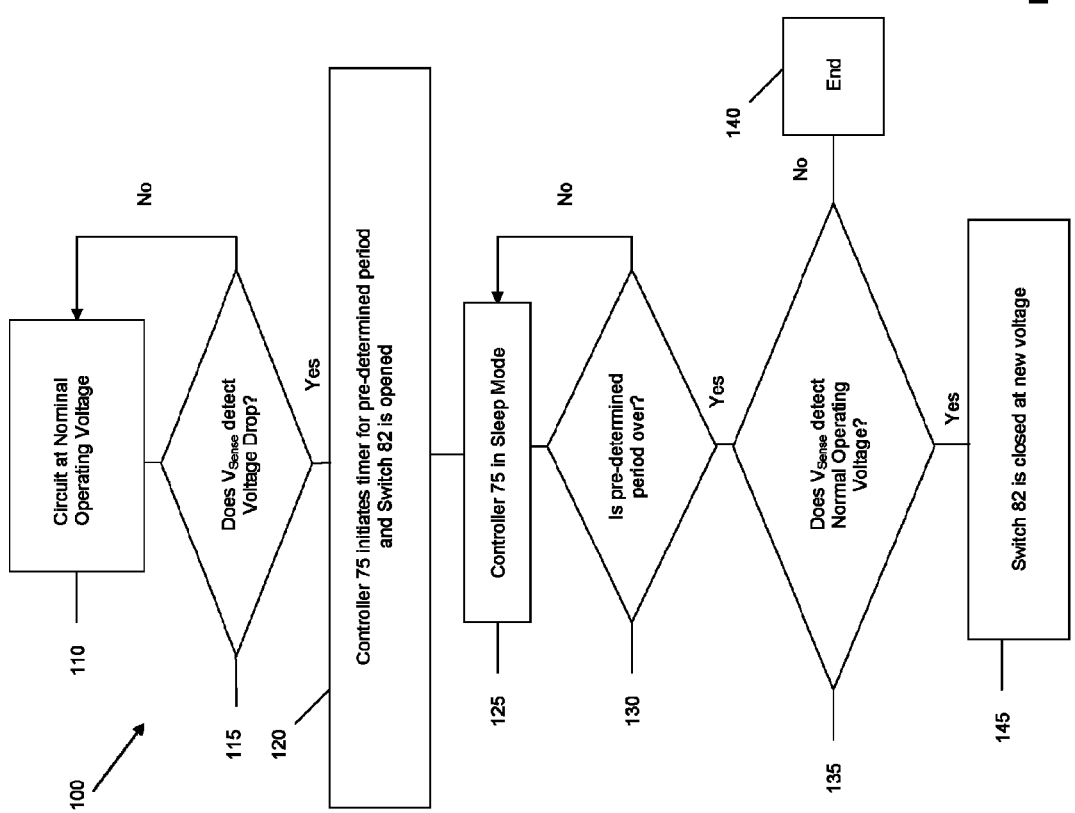
FIG. 9 is a flowchart of the steps occurring during the voltage drop of FIG. 8.
Figure 10:
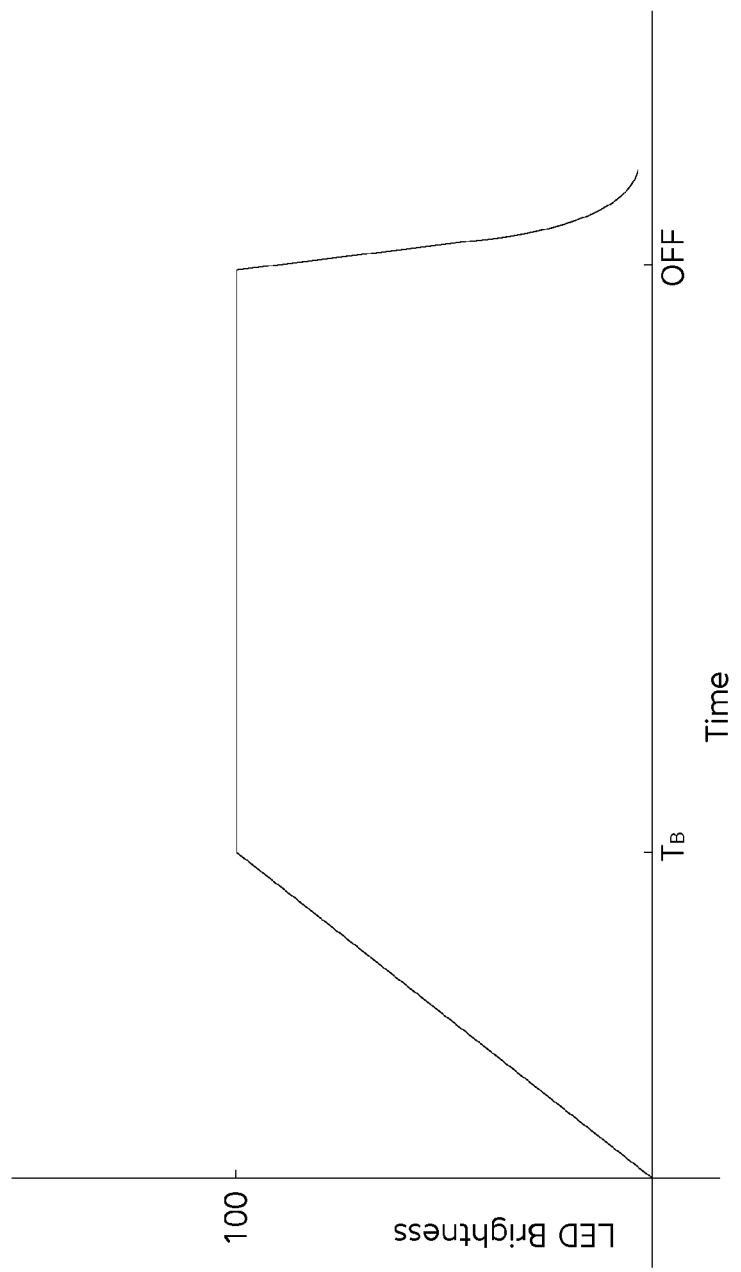
FIG. 10 is a plot of a normal operation of an LED light at full light intensity in accordance with one embodiment of the present invention.

In FIG. 8, the voltage drop during an OFF/ON interval is illustrated. FIG. 9 is a flowchart 100 of the steps occurring during the voltage drop of FIG. 8. The circuit operates at Nominal Operating Voltage 110 ($V_{NOM}$). $V_{sense}$ on controller 75 constantly monitors the voltage from low voltage supply 65. When dimming of LED light 10 is not desired, there is no interruption to the power and the voltage remains constant at $V_{NOM}$. Normal operation of LED light 10 is illustrated at FIG. 10.

When the light switch is turned off ($E_1$) at time $T_1$, LED power converter 80 that provides power to LED array 85 as well as the low voltage supply 65 are de-energized immediately. Controller 75 can continue to function some time longer by using charge stored in capacitor 70. As current is used by controller 75, the operating voltage 110 gradually drops, shown as the first descending slope in FIG. 8. $V_{sense}$ detects a drop in the voltage 115. Controller 75 initiates timer 120 which counts for a pre-determined period (until $T_2$), further explained below. Controller 75 also signals switch 82 to stop switching and rest in an open state which decreases power consumed by some components in controller 75 and switch control circuitry. Controller 75 then goes into a low power consumption or sleep mode 125. Controller 75 remains in sleep mode until the predetermined period has expired 130 at which time ($T_2$) controller 75 powers up or wakes up. $V_{sense}$ then detects 135 whether there is a Nominal Operating Voltage from low voltage supply 65. If not 140, this means the power was not turned on. In this case, the user did not turn the light switch back on. Any remaining energy in the circuit is consumed and voltage drops to below $V_{MIN}$ at which point all state information and memory is lost (ie: LED light 10 has no more energy and remains off). If however $V_{sense}$ does detect a Nominal Operating Voltage, this means that power was turned back on ($E_2$) at the light switch. In this instance, controller 75 sends a signal 145 to switch 82 to begin switching operations which causes power to be sent to LED array 85 at the new voltage in accordance with the Tables.

In one embodiment of the present invention, the AC signal is turned on. Controller 75 ramps up the light intensity from 1 to 100 over a preset time $T_B$, such as 2 seconds. Other preset times to full brightness $T_B$ are considered such as 3 seconds and 4 seconds. In one embodiment, users expect a light bulb to reach full brightness relatively quickly so while it is possible to set any preset time $T_B$ to reach light intensity 100, any time longer than 4 seconds may be too long. Alternatively, in other embodiments, users may require a relatively longer preset time $T_B$.

In order to provide an initial voltage to controller 75 at initial on, a fast start switch may be disposed in the low voltage supply 65 before the DC-DC converter to provide for example an initial 10V to the converter, which in turn steps down the voltage to 3V for input to controller 75. One example of a fast start switch is illustrated in FIG. 4 (see components D9, R1, Q1 and D10). The start-up to full brightness is illustrated in FIG. 10.

Various control modes are illustrated in FIG. 11 in order to achieve desired light intensity levels, ranging from a minimum of 1 (NM or Night Mode) to a maximum of 100, in accordance with one embodiment of the present invention. At initial ON, the brightness increases to 100 at change state T, direction T (labelled TT on the first ascending slope). Full brightness is reached at time $T_B$. Once full brightness 100 is reached, the state changes to FT (dim level A in this figure). See also the change from first to second state in Table 2. When the light switch is toggled OFF, the brightness drops to zero until the light switch is toggled back ON. The interval of the light switch being OFF must be less than the timer's pre-determined period, as discussed above. When the light switch is turned ON, the brightness level increases to the last level stored in memory of controller 75, in this case brightness 100, then it starts to dim down in accordance with state TF. When user chooses a given brightness level, the light switch is toggled OFF, then ON again. The LED brightness again drops to zero during the interval when the light switch is OFF. Once ON again, the brightness increases to the last level stored in memory, which in this case is dim level B, which is the brightness chosen by the user at the time the light switch was toggled OFF. The state is now FF and remains as such until the user desires a brighter level. In this example, the user desires a level to be dimmer than 100 (dim level A) but brighter than the current level (dim level B). A couple iterations of toggling the light switch are required to achieve the desired brightness of dim level C, resulting in state TT, then state FT. If the user next wants to go to Night Mode, the light switch is toggled OFF/ON, resulting in dimming down of the bulb in state TF until dim level 1 is reached, also labelled dim level D in this figure.

FIG. 12 illustrates a Low Dim Mode from full brightness. This is used when the user is at full brightness and then desires the lowest dim level 1 or night mode. At full brightness, the light switch is toggled OFF/ON. The brightness decreases until it reaches dim level 1 and then remains in night mode.

A Dim Mode from full brightness is illustrated in FIG. 13. This is used when the user is at full brightness and then desires a dim level less than full brightness but more than dim level 1. At full brightness, the light switch is toggled OFF/ON. As the brightness level dims, the user chooses the desired dim level and toggles the switch OFF/ON so that the brightness is set at the desired dim level.

Figure 14:
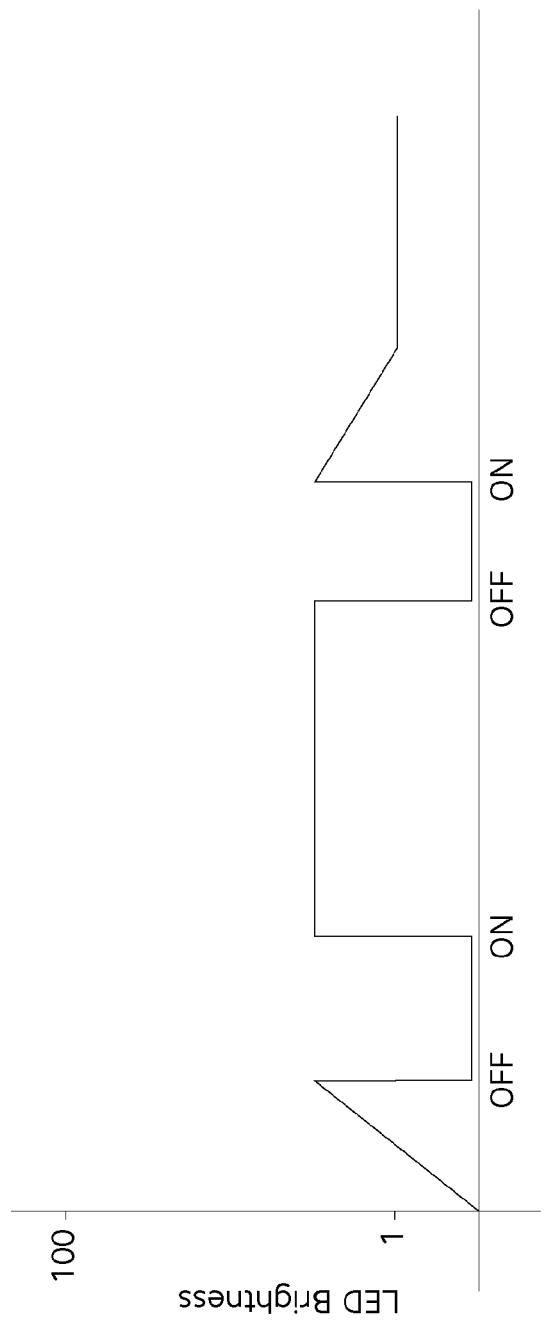
FIG. 14 is a plot of the quick low dim mode brightness over time in accordance with one embodiment of the present invention.

The AC signal can be interrupted during the start-up, before the light intensity level reaches 100 within the preset time, as illustrated in FIG. 14. This is referred to as "Quick Dim Mode" and is used when the user wants to quickly get to dim level 1 when the LED light 10 is first turned on. The user toggles the switch ON/OFF/ON quickly, then after a short pause, the user toggles OFF/ON so that the LED light 10 can quickly reach dim level 1.

Figure 7:
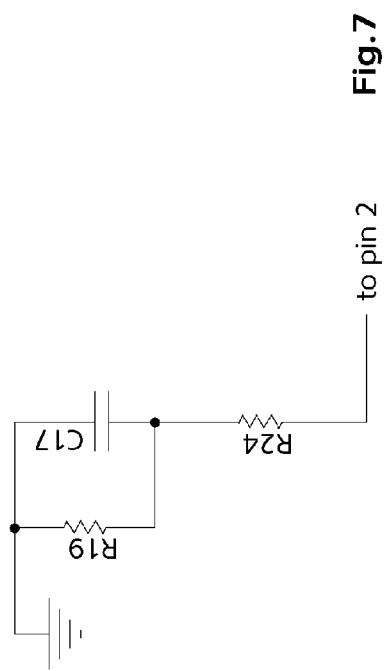
FIG. 7 is a schematic RC circuit diagram which is a timer for coupling to the IC according to a second embodiment of the present.

In one embodiment, when the AC signal is toggled off, the filtered input voltage drops. When controller 75 detects a drop in the filtered input voltage, as compared to a reference voltage, controller is configured to execute certain logic. Controller 75 remains energized during the fixed period that capacitor 70 discharges to the extent there is more than a minimal charge ($V_{MIN}$) to operate controller 75. The logic may include generating a switch signal to stop the switch. This is done immediately since the fast switching operations of switch 82 draw a relatively high amount of energy in a circuit that was just turned off. Controller 75 can then start a timer for a pre-determined period such as 0.5 s. Other predetermined periods are considered. The pre-determined period must be less than the fixed period of capacitor 70. The timer can be an internal timer or another timer such as an RC timer as illustrated in FIG. 7.

In order to conserve energy, controller 75 goes to sleep mode where minimal energy is consumed. If the timer is internal to controller 75, it remains working. At the end of the pre-determined period, controller 75 wakes up and determines whether the filtered input voltage is more than the reference voltage. In other words, controller 75 wakes up to check whether the circuit is energized. This occurs when the AC signal is toggled ON before the end of capacitor 70's fixed period. If the filtered voltage is less than the reference voltage, controller 75 is deenergized.

If the detected filtered voltage is more than the reference voltage, controller 75 changes the light intensity change state and light intensity direction in accordance with set values, as shown in Table 2. Controller 75 generates a switch signal to restart the switch at the previous switch on-time. This will result in a light intensity at the same brightness immediately before power was interrupted. Controller 75 determines the next switch on-time by incrementally increasing or decreasing the on-time value by a set amount.

In one embodiment, the brightness level set by the temporary interruptions of power is communicated in a wired or wireless manner to an external device by the LED light. In this embodiment, the LED light includes a communications module capable of communicating the brightness or enabling the brightness to be read by the external device. The external device may be a computer, smartphone, router or other device capable of storing and/or communicating the brightness level and having volatile or non-volatile memory. The external device may then communicate and store the brightness value in a database stored on a separate storage device located anywhere. The database may then be read by a second external device if appropriate permissions are granted. The method of communicating with the database may be via the Internet or any other wired or wireless connection. The LED light may communicate with the external device via any number of protocols, including but not limited to Zigbee, Bluetooth or WiFi.

In one embodiment, if the light intensity direction is T (ie: the light is dimming up), the increment can be 2. If the light intensity direction is F (ie: the light is dimming down), the increment can be 1. In this embodiment, the LED light 10 is configured to dim up twice as fast as it dims down, so that the LED light 10 can dim up to full brightness relatively quickly and dim down relatively slowly to allow the user sufficient time to choose a desired dim light intensity level. Other increments are considered.

Optionally, controller 75 can generate a switch signal to vary the switch off-time. In one embodiment, switch off-time is increased at lower light intensity levels, such as 10 and lower in order to achieve very low light levels.

Controller 75 then generates another switch signal to switch 82 at the new on-time. The result is a change in the light intensity level in accordance with the set values, such as those of Table 2. Other configurations are contemplated.

While particular embodiments of the invention have been illustrated and described, it will be obvious to those skilled in the art that changes and modifications can be made without departing from the scope of the invention.

The invention claimed is:

1. A dimmable LED light device comprising:
 a power input terminal for receiving power from an AC power source;
 a signal converter for converting the AC power received at the input terminal into DC power;
 an LED array powered by the DC power;
 a controller between said signal converter and said LED array configured to control the brightness of the LED array in response to temporary interruptions in the AC power;
 a temporary energy storage unit connected to said controller, said temporary energy storage unit configured to provide an operating current to said controller until its energy is depleted;
 a low voltage supply receiving the DC power from said signal converter and for generating an input voltage to said controller and to said LED array;
 wherein the temporary energy storage unit comprises a capacitor connected to said controller; said capacitor selected such that its charge is depleted at a predetermined time; wherein said predetermined time is less than a time of said temporary interruption in the AC power such that said controller remains operational during said temporary interruptions in the AC power; and
 a switch controlling power to the LED array and configured to open and close based on signals received from said controller, wherein said controller includes logic to control the brightness of the LED array; said logic including indicators of a change state defining whether or not the LED array is dimming and a direction indicator defining whether the LED array is dimming up over time or dimming down over time.

2. The dimmable LED light device according to claim 1, wherein said controller further includes memory which stores light intensity levels, light intensity change states and light intensity directions.

3. The dimmable LED light device according to claim 2, wherein said controller controls the brightness of the LED array at least by detecting the time between the temporary interruptions in the AC power.

4. The dimmable LED light device according to claim 1, wherein the temporary interruptions in the AC power are provided by the detection of a user cycling an ON/OFF power switch.

5. The dimmable LED light device according to claim 1, further comprising a communications module capable of communicating the light intensity levels or enabling the light intensity levels to be read by an external device.

6. A method for controlling the brightness of an LED light array comprising:
 providing AC power to a power input terminal;
 converting the AC power received at the input terminal into DC power;
 powering the LED array powered by the DC power;
 controlling the brightness of the LED array in response to temporary interruptions in the AC power by way of a controller;
 supplying said controller with an operating current from an energy storage unit until its charge is depleted, the energy storage unit including a capacitor connected to said controller;
 generating an input voltage to said controller by a low voltage supply receiving the DC power;
 wherein the capacitor is selected such that its charqe is depleted at a predetermined time; wherein said predetermined time is less than a time of said temporary interruption in the AC power such that said controller remains operational during said temporary interruptions in the AC power; and
 switching power to the LED array based on signals received from said controller, wherein said controller includes logic to control the brightness of the LED array; said logic including indicators of a change state defining whether or not the LED array is dimming and a direction indicator defining whether the LED array is dimming up over time or dimming down over time.

7. The method according to claim 6, wherein said controller further includes memory which stores light intensity levels, light intensity change states and light intensity directions.

8. The method according to claim 7, wherein the brightness of the LED array is controlled at least by detecting the time between the temporary interruptions in the AC power.

9. The method according to claim 6, further comprising detecting a user cycling an ON/OFF power switch to identify the temporary interruptions in the AC power.

* * * * *